United States Patent
Cho et al.

(10) Patent No.: US 7,411,924 B2
(45) Date of Patent: Aug. 12, 2008

(54) METHOD FOR ALLOCATING SUBCHANNELS IN AN OFDMA MOBILE COMMUNICATION SYSTEM

(75) Inventors: Yoon-Ok Cho, Daejeon (KR); Yong-Hoon Lee, Daejeon (KR); Young-Ho Jung, Busan (KR); Eung-Sun Kim, Suwon-si (KR); Jong-Hyeuk Lee, Seongnam-si (KR); Jae-Hak Chung, Seoul (KR); Chang-Soo Hwang, Yongin-si (KR); Seung-Hoon Nam, Seoul (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 410 days.

(21) Appl. No.: 10/996,699

(22) Filed: Nov. 24, 2004

(65) Prior Publication Data

US 2005/0180354 A1   Aug. 18, 2005

(30) Foreign Application Priority Data

Nov. 25, 2003   (KR) .................. 10-2003-0084029

(51) Int. Cl.
*H04Q 7/24*   (2006.01)

(52) U.S. Cl. .................. 370/328; 370/464; 370/465; 370/329

(58) Field of Classification Search .................. None
See application file for complete search history.

(56) References Cited

U.S. PATENT DOCUMENTS

| 5,506,844 | A | * | 4/1996 | Rao ........................ 370/468 |
| 5,956,674 | A | * | 9/1999 | Smyth et al. ............. 704/200.1 |
| 6,005,893 | A | * | 12/1999 | Hyll ......................... 375/260 |
| 2001/0040880 | A1 | * | 11/2001 | Chen et al. .............. 370/337 |
| 2004/0223511 | A1 | * | 11/2004 | Tzannes .................... 370/464 |

* cited by examiner

*Primary Examiner*—Erika A Gary
(74) *Attorney, Agent, or Firm*—The Farrell Law Firm, PC (57) ABSTRACT

An adaptive modulation scheme relating to an RA problem for maximizing the transmission rates of all users for maximum transmission rates in an OFDMA system including some users requiring to use services at fixed data rates. The scheme proposes introduction of an adaptive modulation using linear programming into an existing scheme for a system including a single kind of users, thereby enabling simultaneous execution of the adaptive modulation for all users in a system including two kinds of users. Further, the invention proposes another scheme of sequentially allocating subchannels to the users when the fixed transmission rate has a sufficiently small value, in order to reduce the complexity.

15 Claims, 4 Drawing Sheets

METHOD FOR ALLOCATING SUBCHANNELS IN AN OFDMA MOBILE COMMUNICATION SYSTEM

PRIORITY

This application claims priority to an application entitled "Method for Allocating Subchannel in an OFDMA Mobile Communication System" filed in the Korean Industrial Property Office on Nov. 25, 2003 and assigned Serial No. 2003-84029, the contents of which are hereby incorporated by reference.

BACKGROUND OF THE INVENTION

1. Field of the Invention

The present invention relates generally to a modulation/demodulation scheme in an Orthogonal Frequency Division Multiple Access (OFDMA) mobile communication system, and more particularly to a method for allocating subchannels in order to apply an optimum modulation/demodulation scheme according to channel conditions.

2. Description of the Related Art

Currently, mobile communication systems are being developed to provide high speed and high quality mobile communication services, such as data services and multimedia services beyond the initial voice-centered services. Further, the $3^{rd}$ generation (3G) mobile communication systems, which is commonly classified into asynchronous mobile communication systems (3GPP) and synchronous mobile communication systems (3GPP2), are being standardized for high speed and high quality wireless data packet services. For example, the 3GPP is now preparing standardizations for the High Speed Downlink Packet Access (HSDPA) scheme and the 3GPP2 is now preparing standardizations for the 1× Evolved Data and Voice (1× EV-DV) scheme. Moreover, the $4^{th}$ generation (4G) mobile communication systems are intended to provide higher speed and higher quality multimedia service than the 3G mobile communication systems.

However, due to the wireless channel conditions, various factors may disturb employment of high degree modulations and high coding rates, which are necessary to provide a high speed and high quality data service. Such factors include white noise, reception signal power changes due to fading, shadowing, Doppler effect due to movement and frequent velocity change of a terminal, interference by another user and multipath signals, etc. Therefore, it is necessary to use a proper modulation scheme and coding scheme in consideration of the changing wireless channel conditions.

In order to provide such a high speed and high quality data service, further advanced technology having an enhanced adaptability for the changing channel conditions as well as the conventional technologies provided by the existing mobile communication systems is necessary.

An Adaptive Modulation and Coding Scheme (AMCS) is a representative of proposals of such advanced technologies. In the AMCS, the modulation scheme and the coding scheme of a data channel are determined according to the channel conditions between a cell and a user, thereby improving the use efficiency of the entire cell. The AMCS classifies the channel conditions into multiple levels and adaptively determines the modulation scheme and the coding scheme according to the levels.

Quadrature Phase Shift Keying (QPSK), 8PSK, and 16QAM (Quadrature Amplitude Modulation) are currently discussed as the possible modulation/demodulation schemes. Additionally, various coding rates, e.g., from ¼ to 1, are considered as the coding rates for the AMCS. Therefore, a mobile communication system using the AMCS applies a high degree modulation/demodulation scheme (8PSK, 16QAM, etc.) and a high coding rate to terminals using high quality channels (e.g., terminals located adjacent to a base station). However, the mobile communication system using the AMCS applies a low degree modulation/demodulation scheme (QPSK) and a low coding rate to terminals using relatively low quality channels (e.g., terminals located at a cell boundary region).

Use of an Orthogonal Frequency Division Multiplexing (OFDM) scheme is highly recommended for the high speed and high quality data service as described above. Therefore, use of the OFDM scheme is now taken into deep consideration for the 4G mobile communication system.

A representative system utilizing the OFDM scheme is an OFDMA-Frequency Division Multiple Access (OFDM-FDMA) system utilizing a multiple access scheme for multiple users, in which all users simultaneously use the entire time while using other subchannels. In an OFDMA system utilizing the AMCS, effective assignment of subchannels to users and determination of modulation schemes for the users should be performed at each time period according to the channel conditions. This method can effectively use all subchannels, except when all users are in deep paging, because the channels between users in the same subchannel are independent from each other. Further, this method can provide a channel diversity effect between users at different locations.

Current research in the AMCS for a system utilizing the OFDMA scheme are being in looked at from two points of view. One standpoint relates to a Margin Adaptive (MA) problem for minimizing the entire transmission power based on given transmission rates of all users and the other standpoint relates to a Rate Adaptive (RA) problem for maximizing the transmission rates of users based on a given entire transmission power.

The RA problem for maximizing a transmission rate can be expressed as shown in Equation (1).

$$\max_{c_{k,n}, \rho_{k,n}} \min_{k} R_k = \max_{c_{k,n}, \rho_{k,n}} \min_{k} \sum_{n=1}^{N} c_{k,n} \cdot \rho_{k,n} \quad (1)$$

$$\text{subject to} \sum_{k=1}^{K} \sum_{n=1}^{N} f_k(c_{k,n})\rho_{k,n} / \alpha_{k,n}^2 \leq P_T$$

$$\sum_{k=1}^{K} \rho_{k,n} = 1, \text{ for all } n$$

The original problem expressed as Equation 1 can be replaced by Equation (2) as an equivalent expression shown below.

$$\max_{c_{k,n}, \rho_{k,n}} z \quad (2)$$

-continued $$\text{subject to } R_k = \sum_{n=1}^{N} c_{k,n} \cdot \rho_{k,n} = z, \text{ for all } k$$

$$\sum_{k=1}^{K} \sum_{n=1}^{N} f_k(c_{k,n})\rho_{k,n}/\alpha_{k,n}^2 \leq P_T$$

$$\sum_{k=1}^{K} \rho_{k,n} = 1, \text{ for all } n$$

In Equations (1) and (2), $\rho_{k,n}$ is an identifier (binary variable) indicating that the k-th user occupies the n-th subcarrier, $c_{k,n}$ indicates the k-th user's bit allocated to the n-th subcarrier, $R_k$ indicates k-th user's data rate, $P_T$ indicates total power, and $f_k(c)$ indicates required received power for reliable reception of c bits/symbol.

The AMCS for the system utilizing the OFDMA scheme independently considers the RA problem and the MA problem for minimizing the entire power with the fixed transmission rates that is, the AMCS researched to date cannot be used in an actual system including users of both standpoints, because the conventional AMCS independently considers the two standpoints. Therefore, in a system including some users to which services requiring fixed transmission rate such as Video-on-Demand (VOD) are provided, it is unnecessary to maximize the transmission rates of all users as opposed to the RA problem. Therefore, a new adaptive modulation technique is necessary in consideration of such a problem.

In order to satisfy such a necessity, an optimal solution for the adaptive modulation problem can be obtained by expressing the adaptive modulation problem as a nonlinear optimization problem and then converting the nonlinear optimization problem into a linear optimization problem that can be solved by Integer Programming (IP). However, such a method for obtaining an optimal solution cannot be used in real-time because of the complexity of the method.

SUMMARY OF THE INVENTION

Accordingly, the present invention has been designed to solve the above and other problems occurring in the prior art. An object of the present invention is to provide an adaptive modulation scheme for obtaining a maximum transmission rate in an OFDMA mobile communication system including users that are using two different kinds of services.

It is another object of the present invention to provide an adaptive modulation scheme for reducing a complexity by consecutively performing channel allocation for users using two different kinds of services.

In order to accomplish the above and other objects, a method is provided for allocating subchannels and bits to each of the users for adaptive modulation, which is employed in a mobile communication system including both users requiring services of fixed transmission rates and users requiring services of variable transmission rates. The method includes the steps of: determining a real number $\{z, c_k\}$ by using a Lagrange Multiplier Method, the real number $\{z, c_k\}$ maximizing an objective equation in order to reconstruct a variable rate adaptive problem into a delivery problem; solving the delivery problem through linear programming and allocating subchannels to each of the users; and allocating bits to each of the subchannels allocated to each of the users by using a Greedy Algorithm.

In accordance with another aspect of the present invention, a method is provided for allocating subchannels and bits to each of the first users and the second users for adaptive modulation, which is employed in a mobile communication system including first users requiring services of fixed transmission rates and second users requiring services of variable transmission rates. The method includes the steps of: allocating subchannels and bits to the second users; determining an initial number $N_{MA}$ of subchannels to be allocated to the first users; releasing the predetermined initial number $N_{MA}$ of subchannels from among the subchannels allocated to the second users; reallocating the released subchannels to the first users; allocating bits for the first users to reallocated subchannels; and repeating the third step through the fifth step a predetermined number of times.

In accordance with another aspect of the present invention, an apparatus is provided for transmitting data to each of the users through adaptive modulation, which is employed in a mobile communication system including users requiring services of fixed transmission rates and users requiring services of variable transmission rates. The apparatus includes: a subchannel allocation and bit loading algorithm unit for determining, using a Lagrange Multiplier Method, a real number $\{z, c_k\}$, which maximizes an objective equation in order to reconstruct a variable rate adaptive problem into a delivery problem, linear programming and allocating subchannels to each of the users, and allocating bits to each of the subchannels allocated to each of the users by using a Greedy Algorithm; an adaptive modulator for adaptively modulating each user data by means of the subchannels and bits allocated to each of the users and separately outputting the data for each of the allocated subchannels; and an Inverse Fast Fourier Transform (IFFT) unit for converting the separated user data into a time domain signal and outputting the time domain signal as one signal sequence.

In accordance with another aspect of the present invention, an apparatus is provided for transmitting data to each of the users through adaptive modulation, which is used in a mobile communication system including first users requiring services of fixed transmission rates and second users requiring services of variable transmission rates. The apparatus includes: a subchannel allocation and bit loading algorithm unit for allocating subchannels and bits to the second users, determining an initial number of subchannels to be allocated to the first users, releasing the predetermined initial number of subchannels from among the subchannels allocated to the second users, reallocating the released subchannels to the first users, and allocating bits for the first users to reallocated subchannels; an adaptive modulator for adaptively modulating each user data by means of the subchannels and bits allocated to each of the users and separately outputting the data for each of the allocated subchannels; and an Inverse Fast Fourier Transform (IFFT) unit for converting the separated user data into a time domain signal and outputs the time domain signal as one signal sequence, wherein the subchannel allocation and bit loading algorithm unit repeats a predetermined number of times the process from the releasing of the predetermined initial number of subchannels to the allocation of the bits.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention. Further, for effective description of the present invention, a mobile communication network using an OFDMA scheme will be used as an example of the mobile communication system.

Basically, the present invention proposes an adaptive modulation technique for providing a maximum transmission rate to all users in an OFDMA system including two categories of users. That is, the present invention provides a solution for a modified RA problem, which reflects existence of some users requiring to use a fixed transmission service, in addition to the RA problem for maximizing the transmission rates of all users.

As indicated above, an optimal solution for an adaptive modulation problem can be expressed as a nonlinear optimization problem, and the nonlinear optimization problem can be then converted into a linear optimization problem that can be solved by Integer Programming (IP). However, such a method for obtaining an optimal solution cannot be used in real-time because of the complexity of the method. Therefore, the present invention proposes two sub-optimization schemes. The first sub-optimization scheme is similar to the adaptive modulation scheme using the IP in the conventional system including only one type of users, and the second sub-optimization scheme reduces the complexity by consecutively performing allocation of subchannels to the two types of users.

Before describing the present invention, a Lagrange Multiplier Method and a Greedy Algorithm used in the embodiments of the present invention will briefly be described first.

Generally, the Lagrange Multiplier Method is used to find a maximum value and a minimum value of a differentiable function in a closed interval [a,b]. First, limited values are obtained through differentiation in an open interval (a,b) and boundary values are obtained. The largest value and the smallest value from among the limited values and boundary values are determined as the maximum value and the minimum value. In order to determine a maximum value and a minimum value of a differentiable multivariate function $f$ in a domain D on a plane or space, limited values must be obtained through differentiation in the domain D and boundary values must be obtained. Here, finding the limited values implies finding critical points, i.e., finding points where grad $f$=0. However, it is problematic when the boundary values are not finite. This implies that the maximum value and the minimum value cannot be obtained by only substitution. In this case, the curve representing the boundary (g=c) is usually called a 'constraint'. The most commonly used method for obtaining a maximum value and a minimum value of a function $f$ under such a 'constraint' is the Lagrange Multiplier Method. It is generally known that, when grad g is not 0, a constant a satisfying an equation, grad $f$=a grad g, exists at the maximum and minimum points of the function $f$ under the constraint (g=c).

Basically, the Greedy Algorithm is a step-by-step recipe for solving a problem in which only a currently best item is selected from a series of data items on the basis of only a given standard for the selection, regardless of past or future selections. The Greedy Algorithm together with the dynamic programming is frequently used to solve the optimization problem. The dynamic programming is intended to find an optimized solution by using its feedback property in the course of division into smaller parts.

However, the Greedy Algorithm reaches the optimized solution by repeatedly selecting most suitable solutions for a given situation each time. This characteristic enables the Greedy Algorithm to obtain locally optimal solutions through each selection. However, it cannot be said that the locally optimal solutions are always globally optimal solutions. Therefore, in a given Greedy Algorithm, it must be verified each time whether the locally optimal solutions guarantee the globally optimal solutions.

Accordingly, the following description of the present invention discloses a new standpoint establishing the optimization problem of the adaptive modulation technique as a modified RA problem and proposes two sub-optimization schemes applicable to actual systems.

1. Structure of Transmitter/Receiver

Figure 1:
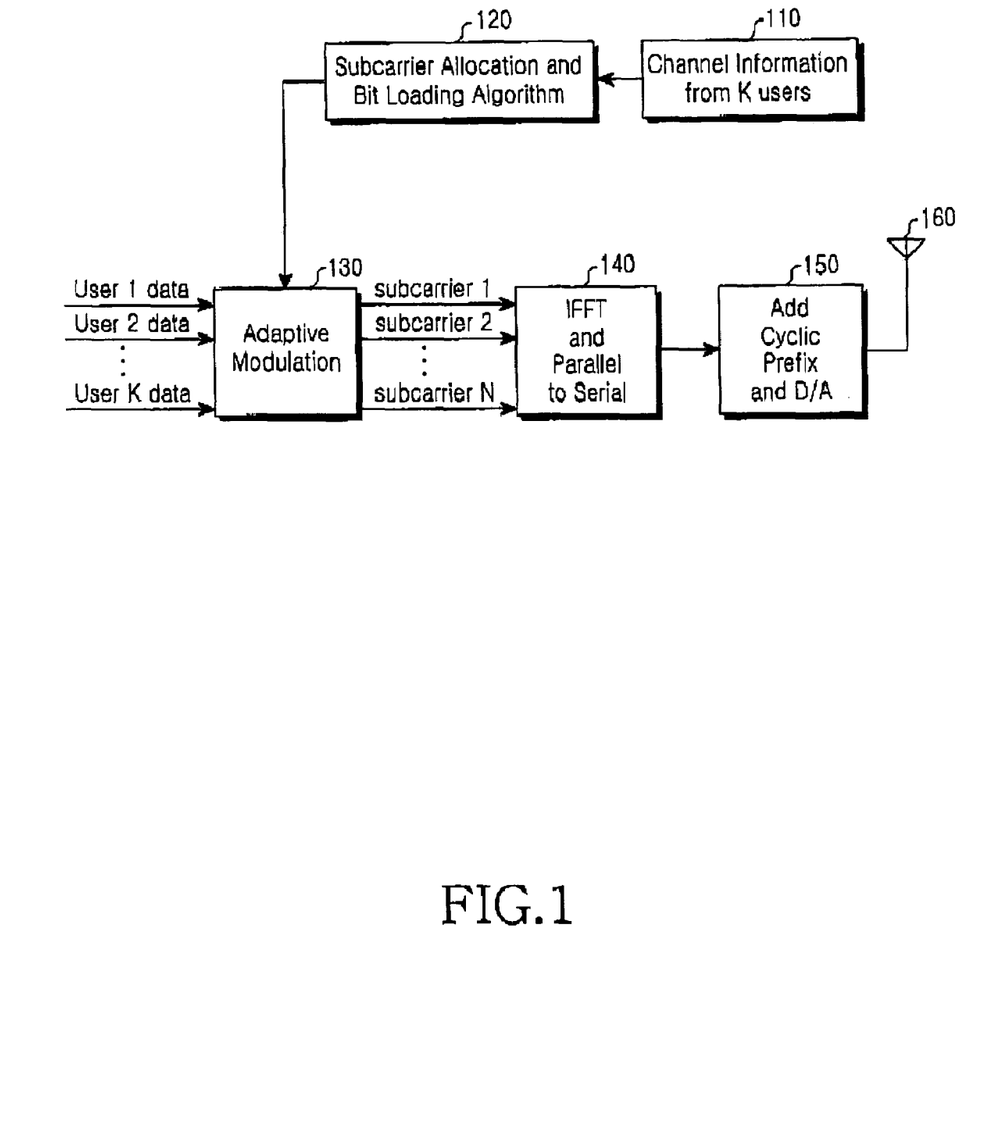
FIG. 1 is a block diagram illustrating a transmitter in an OFDMA system according to an embodiment of the present invention.

FIG. 1 is a block diagram illustrating a transmitter in an OFDMA system according to an embodiment of the present invention. In FIG. 1, K denotes the number of users and N denotes the number of subchannels. It is noted from FIG. 1 that data for K users is transmitted through N subchannels.

Referring to FIG. 1, data (User 1 data, User 2 data, . . . , User K data,) to be transmitted to the K users is input to an adaptive modulation unit 130. The channel information 110 fedback from the K users is provided to a subcarrier allocation and bit loading algorithm unit 120. The subcarrier allocation and bit loading algorithm unit 120 allocates subchannels to each user based on the channel information 110 and loads bits to be used for the allocated subchannels. The operation of the subcarrier allocation and bit loading algorithm unit 120 according to embodiments of the present invention will be later in more detail.

The adaptive modulation unit 130 adaptively modulates the user data according to determination of the subcarrier allocation and bit loading algorithm unit 120 and separately outputs the modulated user data for each of the N subcarriers (Subcarrier 1, Subcarrier 2, . . . , Subcarrier N). The separated user data for the subcarriers are input to an Inverse Fast Fourier Transform (IFFT) unit 140. The IFFT unit 140 converts the user data of a frequency domain input for each subchannel into signals of a time domain. Further, the IFFT unit 140 serial-converts the IFFT-converted parallel signal sequences and outputs one serial signal sequence. The unit 150 adds a guard interval (cyclic prefix) into the serial signal sequence and then converts the sequence into an analog signal. The converted analog signal is then transmitted through an antenna 160.

As noted from the transmitter described above, in order to apply the AMC scheme, the channel information from each user is received and then used in allocating subchannels and loading bits. That is, the adaptive modulation is performed based on the channel information of each user.

Figure 2:
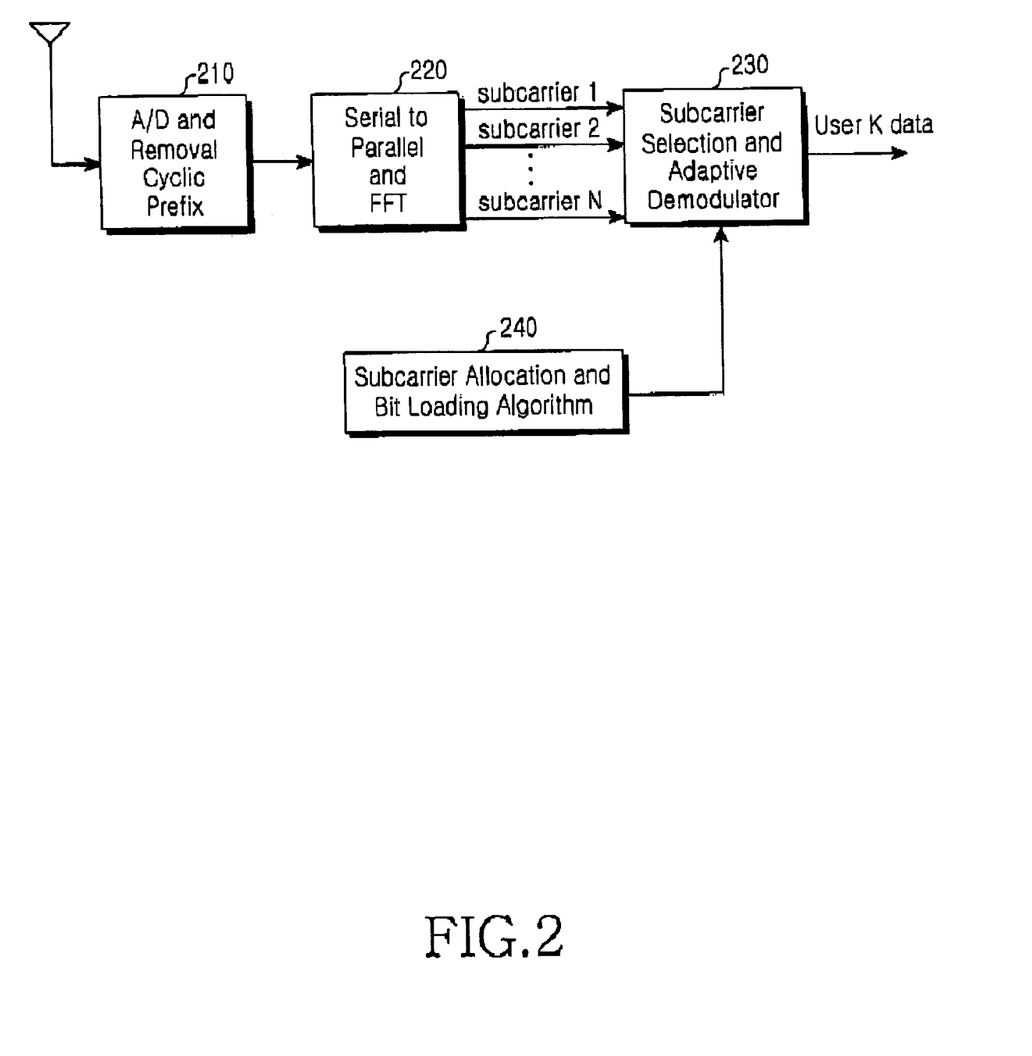
FIG. 2 is a block diagram illustrating a receiver corresponding to the transmitter illustrated in FIG. 1.

FIG. 2 is a block diagram of a receiver corresponding to the transmitter illustrated in FIG. 1. The receiver in FIG. 2 is based on an assumption that receivers of some users from among the K users receive the user data transmitted through the N subchannels.

Referring to FIG. 2, an analog signal received by an antenna is provided to a unit 210. The unit 210 converts the analog signal into a digital signal and eliminates a guard interval from the digital signal. The digital signal from which the guard interval has been eliminated is transferred to a serial to parallel and Fast Fourier Transform (FFT) unit 220. The serial to parallel and FFT unit 220 divides the signal into parallel signals for the N subchannels and performs FFT for each of the divided parallel signals. The FFT-performed signals are transferred to a subcarrier selection and adaptive demodulator 230.

The receiver also includes a subcarrier allocation and bit loading algorithm unit 240, which is the same as the subcarrier allocation and bit loading algorithm unit 120 of the transmitter. The subcarrier allocation and bit loading algorithm unit 240 allocates subchannels to be used by the receiver itself and determines bits to be used in the allocated subchannels. The operation of the subcarrier allocation and bit loading algorithm unit 240 according to embodiments of the present invention will be later in more detail.

A demodulation scheme of the subcarrier selection and adaptive demodulator 230 is determined based on the bits determined in the allocated subchannels. When the demodulation scheme has been determined, the subcarrier selection and adaptive demodulator 230 selects the determined subchannels from among the N subchannels. Further, the demodulator 230 demodulates the user data received through the selected subchannels according to the determined demodulation scheme and outputs final user data.

As described above with reference to FIGS. 1 and 2, the transmission-side AMC module compares the channel gain of each subchannel of all users, allocates the N subchannels to all of the K users, while avoiding overlapping, and allocates bits to the allocated subchannels of each user. According to the bit allocation, a modulation scheme to be used for each subchannel is determined. Information of the subchannel and bit allocation performed by the base station is transmitted to each user through a downlink control channel and each user uses this information to demodulate the signal.

2. Embodiments of the Present Invention 2.1 Problem Formation and Optimal solution First, parameters employed in the present invention will be described. More specifically, $c_{k,n}$ denotes the k-th user's bit allocated to the n-th subcarrier, which is an element of a set D of positive integers between 0 and M (the number of bits assignable to one subchannel). Additionally, n denotes a certain subchannel and k denotes a certain user from among the K users. An indication parameter $\rho_{k,n}$ denotes an identifier (binary variable) indicating that the k-th user occupies the n-th subcarrier. Accordingly, each subchannel should be assigned to only one user.

$R_k$ denotes the k-th user's data rate and $P_T$ denotes the total power. Therefore, the $P_T$ may be expressed as the sum of power $P_{k,n}$ assigned to each subchannel of each user. Further, the two kinds of users employed in the present invention as will be described below are users intending to use service of a fixed transmission rate and users intending to maximize the transmission rate.

The indication parameter $\rho_{k,n}$ can be defined as shown in Equation (3) below.

$$\rho_{k,n} = \begin{cases} 0, & \text{if } c_{k,n} = 0 \\ 1, & \text{otherwise} \end{cases} \quad (3)$$

As noted from Equation (3), when no bit of the k-th user has been assigned to the n-th subchannel, the indication parameter $\rho_{k,n}$ is set to be 0. Otherwise, the indication parameter $\rho_{k,n}$ is set to be 1.

$$\sum_{k=1}^{K} \rho_{k,n} = 1 \text{ for all } n \quad (4)$$

Equation (4) shows that the sum of the indication parameters $\rho_{k,n}$ given to all users converges to 1.

In the present invention, finding a solution for the adaptive modulation actually corresponds to determining $c_{k,n}$ and $\rho_{k,n}$. These parameters can also express the transmission rate and power.

Equation (5) below defines $R_k$, which represents the k-th user's data rate, and Equation 6 defines $P_T$, which represents the total power of the k-th user having bit/OFDM symbol unit.

$$R_k = \sum_{n=1}^{N} c_{k,n} \cdot \rho_{k,n} \quad (5)$$

$$P_T = \sum_{k=1}^{K} \sum_{n=1}^{N} P_{k,n} = \sum_{k=1}^{K} \sum_{n=1}^{N} f_k(c_{k,n}) / \alpha_{k,n}^2 \quad (6)$$

Here, $f_k(c_{k,n})$ denotes the transmission power for the k-th user at the reception terminal that is necessary for transmission satisfying a desired Bit Error Rate when the channel gain is 1, and $\alpha_{k,n}$ denotes a channel gain of the k-th user at the n-th subchannel.

If an index set of all users is given as $U=\{1, 2, \ldots, K\}$, U can be divided into two subsets, which include an index set $U_{Fixed}$ of $K_1$ users to which services will be provided at a fixed transmission rate $R_M$ and an index set $U_{RA}$ of $K_2$ users for maximizing the transmission rate considered in the typical RA problem. Using Equations (3) through (6) and the user index sets described above, the above-described RA optimization problem can be modified to form an adaptive modulation problem for maximizing the transmission rate for the two kinds of users. The formed adaptive modulation problem will be referred to as a "modified rate adaptive problem".

An optimal solution for the problem can be obtained through Equation (7) below using an Integer Programming (IP).

$$\max_{c_{k,n}, \rho_{k,n}} z \quad (7)$$

-continued $$\text{subject to} \sum_{n=1}^{N} c_{k,n}\rho_{k,n} = R_M, \text{ for } k \in U_{Fixed}$$

$$\sum_{n=1}^{N} c_{k,n}\rho_{k,n} = z, \text{ for } k \in U_{RA}$$

$$\sum_{k=1}^{K} \sum_{n=1}^{N} f_k(c_{k,n})\rho_{k,n}/\alpha_{k,n}^2 \le P_T$$

$$\sum_{k=1}^{K} \rho_{k,n} = 1, \text{ for all } n$$

However, the method of Equation (7) cannot be employed in an actual system due to its complexity. Therefore, in order solve this problem, the present invention proposes two sub-optimization schemes, operations according to which will be described hereinafter. In the two sub-optimization schemes proposed by the present invention, subchannel allocation and bit allocation are separately performed in order to reduce the complexity in finding the optimal solution using the IP.

The first sub-optimization scheme is a suitable extension of the conventional technique of solving the RA problem for the present invention, in which an adaptive modulation is simultaneously performed for all users. The second sub-optimization scheme is a scheme of sequentially allocating subchannels to users when the fixed transmission rate has a sufficiently small value, in order to further reduce the complexity of the first sub-optimization scheme.

In the following description, in relation to the RA problem for maximizing the transmission rates of all users, a process of forming a new adaptive modulation scheme problem when the system includes some users using services of fixed transmission rates, expressing an optimal solution for the problem by IP, and finding the optimal solution will be discussed together with properties of the optimal solution.

2.2 First Embodiment

An RA-based sub-optimization scheme for simultaneously performing an adaptive modulation for all users according to the first embodiment of the present invention, which is a suitable extension of the conventional technique of solving the RA problem for the present invention, will be described in detail herein below.

The proposed RA-based sub-optimization scheme is similar to the scheme of finding a solution for the previously-proposed RA optimization problem using the LP (Linear Programming), except that the subchannel allocation and the bit allocation are separately performed in the RA-based sub-optimization scheme. That is, a process according to the first embodiment of the present invention includes a subchannel allocation process and a bit allocation process. The subchannel allocation process includes a step of modifying the above-mentioned IP problem into an LP problem and a step of finding a solution for the modified LP problem (which is a delivery problem through a simple algorithm such as a Vogel's method.

In the bit allocation process, bit allocation, which is optimum in an OFDM system including one user, is performed for each user by a Greedy Algorithm, etc., after the subchannel allocation to each user is completed. The subchannel allocation process and the bit allocation process are based on an assumption that the same bits are assigned to subchannels used by one user when the subchannel allocation and the bit allocation are independently performed.

First, the subchannel allocation is performed on an assumption that the same bits are assigned to subchannels used by one user. This assumption can be expressed as shown in Equations (8) and (9).

$$c_{k,n} = \begin{cases} c_k, & \text{if } \rho_{k,n} = 1 \\ 0, & \text{otherwise} \end{cases} \quad (8)$$

$$\alpha_{k,n}^2 = \begin{cases} \alpha_k^2, & \text{if } \rho_{k,n} = 1 \\ 0 & \text{otherwise} \end{cases} \quad (9)$$

Equations (8) and (9) imply that the subchannel allocation and the bit allocation can be independently performed.

On this assumption, the Modified Rate Adaptive (MRA) problem expressed by Equation (7) can be re-constructed to be a simple delivery problem as shown by Equation (10) by finding values of z* and $c_k$. That is, the MRA problem expressed by Equation 7 can be modified into a delivery problem, which is a special type of the LP problem.

$$\min_{\rho_{k,n}} \sum_{k=1}^{K} \sum_{n=1}^{N} r_{k,n}\rho_{k,n} \quad (10)$$

$$\text{subject to} \left. \begin{array}{l} \sum_{n=1}^{N} \rho_{k,n} = n_k \\ \sum_{k=1}^{K} \rho_{k,n} = 1 \end{array} \right\} \text{where } r_{k,n} =$$

$$f_k(c_k)/\alpha_k^2 \text{ and } n_k = \begin{cases} R_M/c_k, & \text{for } k \in U_{Fixed} \\ z^*/c_k, & \text{for } k \in U_{RA} \end{cases}$$

$$n_k = z^*/c_k, \text{ for all } k \text{ (RA problem)}$$

The re-constructed delivery problem shown in Equation (10) enables the subchannel allocation to be performed by an LP or a Vogel's method, which is an heuristic method of the LP. That is, the subchannels can be allocated in real-time using a sub-optimization scheme (an LP or a Vogel's method, which is a heuristic method of the LP).

Equation (10) can be replaced by Equation (11).

$$\max_{c_k} z \quad (11)$$

$$\text{subject to } \sum_{k \in U_1} f_k(c_k) \cdot R_M/\alpha_k^2 c_k + \sum_{k \in U_2} f_k(c_k) \cdot z/\alpha_k^2 c_k \le P_T$$

$$\sum_{k \in U_1} R_M/c_k + \sum_{k \in U_2} z/c_k = N$$

Here, the RA problem is defined as $$\sum_{k=1}^{K} f_k(c_k) \cdot z/\alpha_k^2 c_k \le P_T, \sum_{k=1}^{K} z/c_k = N$$

In Equation 11, $U_1$ signifies $U_{Fixed}$ and $U_2$ signifies $U_{RA}$.

As described above, a constraint must be solved in order to reconstruct the delivery problem as shown in Equation (10).

Here, the constraint is to find a real number $\{z, c_k\}$ maximizing the objective equation. In order to find a real number $\{z, c_k\}$ maximizing the objective equation, the Lagrange function as shown by Equation 12 can be used.

$$\max_{z^*, c_k^*}(z, c_k, \lambda, \mu) = \qquad (12)$$

$$z - \lambda \left( \sum_{k \in U_{Fixed}} f_k(c_k) \cdot R_M / \alpha_k^2 c_k + \sum_{k \in U_{RA}} f_k(c_k) \cdot z / \alpha_k^2 c_k - P_T \right) -$$

$$\mu \left( \sum_{k \in U_{Fixed}} R_M / c_k + \sum_{k \in U_{RA}} z / c_k - N \right)$$

When the value $\{z, c_k\}$ is obtained, the MRA problem is changed to a delivery problem, which is a special type of the LP problem. The subchannel allocation can be performed by an LP or a Vogel's method, which is a heuristic method of the LP. When the subchannel allocation has been completed, the bit allocation is performed using a Greedy Algorithm as in the adaptive modulation scheme under a single user environment. That is, using the Greedy Algorithm, bits are allocated first to fixed rate users and then to RA users.

2.3 Second Embodiment

Generally, the fixed transmission rate of the user set $U_{Fixed}$ using services such as a voice service, a Video-On-Demand (VOD) service, etc., is smaller than the transmission rate of the user set $U_{RA}$. Therefore, the subchannel and bit allocation process for the users of the set $U_{Fixed}$ is expected to be relatively simpler than that for the users of the set $U_{RA}$. Accordingly, the second embodiment of the present invention proposes a method of consecutively allocating the subchannels to the users of the two sets.

Figure 3:
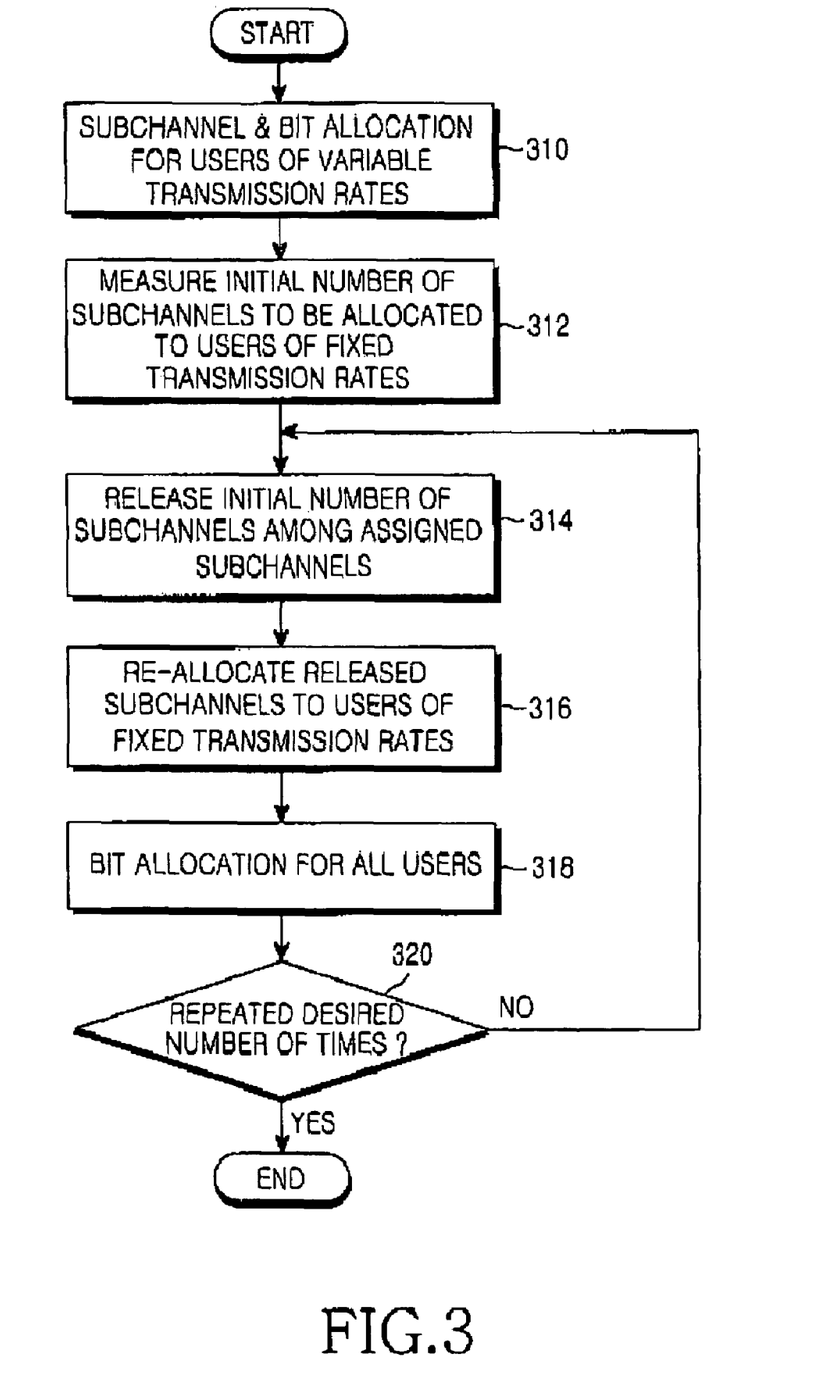
FIG. 3 is a flowchart illustrating a sub-optimization algorithm of a consecutive subchannel allocation according to an embodiment of the present invention.

FIG. 3 illustrates a sub-optimization algorithm of a consecutive subchannel allocation according to the second embodiment of the present invention. Referring to FIG. 3, in step 310, subchannels and bits corresponding to the subchannels are first allocated for RA mode users having variable data transmission rates. That is, subchannels and bits are first allocated to the users of the set $U_{RA}$.

In step 312, an initial number $N_{MA}$ of subchannels to be evacuated for allocation to the users of the set $U_{Fixed}$ is determined. When $N_{MA}$ has been determined, in step 314, the $N_{MA}$ subchannels from among the subchannels allocated to the users of the set $U_{RA}$ are released according to a sequence in which a subchannel having the lowest channel quality precedes the other channels.

In step 316, subchannels are allocated to users of the set $U_{Fixed}$. That is, the released subchannels are re-allocated to the users of the fixed transmission rates. In step 318, bit allocation is performed for all users. However, the initial $N_{MA}$ represents an approximate number of subchannels, and cannot guarantee the optimum performance. Therefore, in step 320, it is determined if the release and re-allocation of the $N_{MA}$ subchannels have been repeated a desired number of times. When the release and re-allocation have not been repeated a desired number of times, steps 314 through 318 are performed again. Through the above-mentioned repetition, an exact number of subchannels to be allocated is determined.

An advantage of the second embodiment of the present invention is that the complexity can be reduced by the separate allocation for each user when the transmission rate of the set $U_{Fixed}$ is small. Therefore, if the algorithm has too many times of repetition, the second embodiment of the present invention may become meaningless.

The repetition is a process for finding an optimum value from the initial value $N_{MA}$. Therefore, in order to reduce the number of repetitions, it is important to exactly determine the initial value $N_{MA}$.

Equation (13) below shows an example of a process for determining the initial value $N_{MA}$.

$$N_{MA} = \sum_{k \in U_{Fixed}} n_k = \sum_{k \in U_{Fixed}} R_M / c_k^* \qquad (13)$$

As noted from Equation (13), the value $N_{MA}$ can be obtained using values $R_M$ and $c_k$. $c_k$ can be obtained by applying variables $(\lambda, \mu)$ to Equation (12) expressing the Lagrange function reflecting all users. Here, the result of Equation (12) is set to be 0. This can be expressed again in Equation (14).

$$\frac{\partial L(z, c_k, \lambda, \mu)}{\partial c_k} = 0 \rightarrow c_k f_k(c_k) - f_k(c_k) - f_k(c_k) = \alpha_k^2 \mu / \lambda \qquad (14)$$

Therefore, when the subchannel allocation is performed in consideration of only the RA users in step 312, a Lagrange functional equation similar to Equation (12) is also used. Equation (15) shows an example of such a Lagrange functional equation.

$$\max_{c_k, z}(z, c_k, \lambda, \mu) = z - \lambda \left( \sum_{k=1}^{K_1} f_k(c_k) \cdot R_M / \alpha_k^2 c_k + \right. \qquad (15)$$

$$\left. \sum_{k=1}^{K_2} f_k(c_k) \cdot z / \alpha_k^2 c_k - P_T \right) -$$

$$\mu \left( \sum_{k=1}^{K_1} R_M / c_k + \sum_{k=1}^{K_2} z / c_k - N \right)$$

$$\approx z_1 - \lambda_1 \left( \sum_{k=1}^{K_2} f_k(c_k) \cdot z_1 / \alpha_k^2 c_k - P_T \right) -$$

$$\mu_1 \left( \sum_{k=1}^{K_2} z_1 / c_k - N \right)$$

If the fixed transmission rate $R_M$ has a small value, it can be confirmed in step 310 that the parameters have values similar to the actual values of parameters $(\lambda, \mu)$. That is, it is confirmed that the equation, $c_k f'_k(c_k) - f_k(c_k) = \alpha_k^2 \mu_1 / \lambda_1$, is true. Therefore, the initial value $N_{MA}$ can be estimated using those values by Equation (13).

2.4 Performance Comparison

In simulation tests for the embodiments of the present invention, 64 subchannels were used, and the set $U_{Fixed}$ included $K_1$ users and the set $U_{RA}$ included $K_2$ users. A maximum of 12 bits were assignable to one subchannel, and a desired BER for all users was $10^{-4}$.

Each channel was assumed to be an 8-tap frequency selective channel having exponentially decreasing power distribution instead of changing within the same frame. Also, it was assumed that users have different average channel gains in the simulation tests, because the users actually have different channel gains according to their locations. A ratio between the maximum value and the minimum value of the average channel gains was put as γ.

Figure 4:
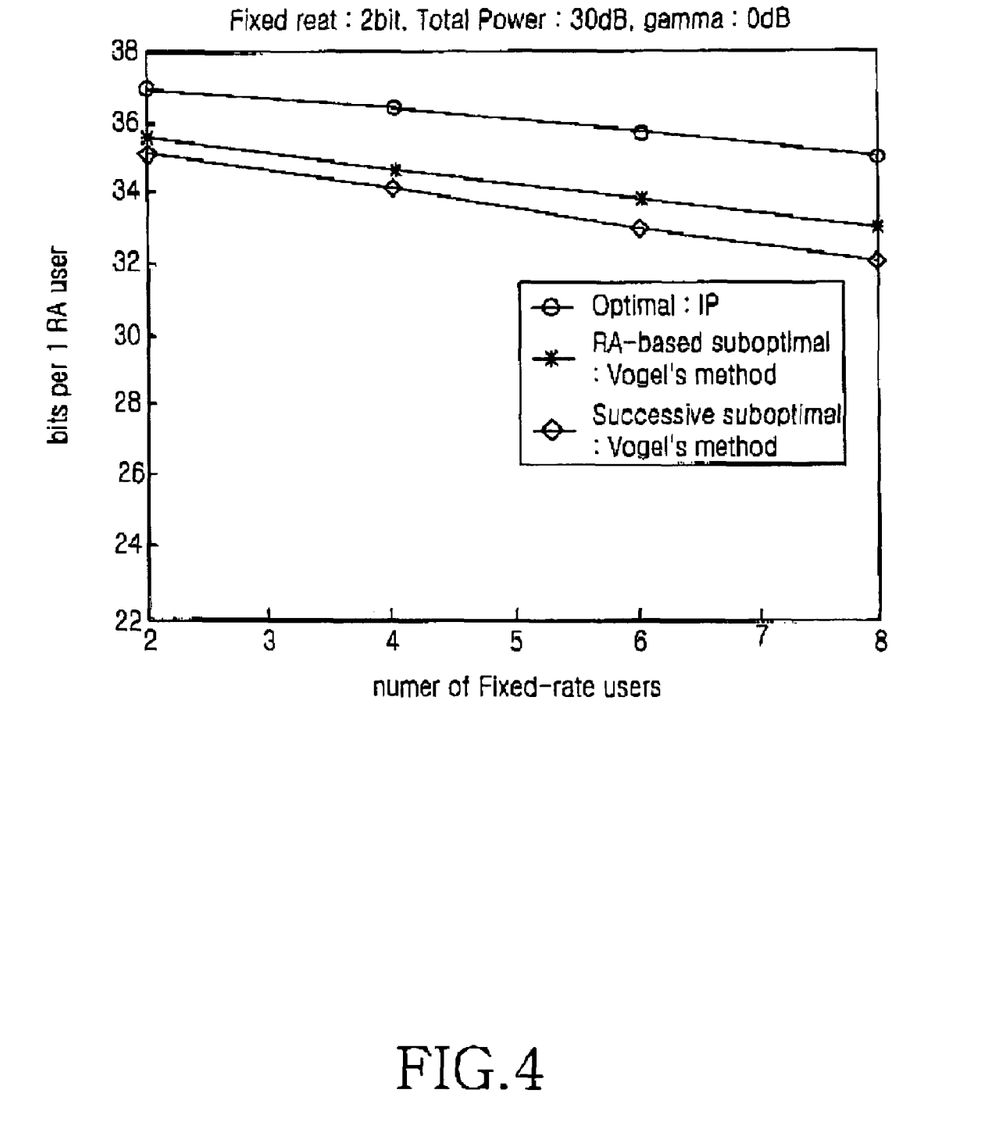
FIG. 4 is a graph illustrating performance differences according to a number of users when the conventional method and the schemes of the present invention are applied, respectively.

FIG. 4 is a graph illustrating results of comparisons according to the number of users, which shows differences of solutions obtained by the conventional method and solutions obtained by the method proposed by the first and second embodiments of the present invention with respect optimal solutions, on a condition that $K_1=K_2=4$, $K_M=2$, $P_T=30$ dB, and γ=30 dB. When the set $U_{Fixed}$ includes 2 users, the RA-based sub-optimization scheme proposed by the first embodiment of the present invention showed a difference of 1.4 bits with respect to a result by the optimal solution, and the consecutive subchannel allocation sub-optimization scheme proposed by the second embodiment of the present invention showed a difference of 1.7 bits. However, when the set $U_{Fixed}$ includes 8 users, the results by the first and second embodiments of the present invention showed differences of 2.1 bits and 3.0 bits, respectively. That is, both of the two kinds of sub-optimization schemes proposed by the present invention showed performance similar to that by the optimal solutions and showed the same tendency according to the increase in the number of the users. However, it was concluded that the performance of the consecutive sub-optimal allocation is more degraded according to the increase of the users.

Hereinafter, the complexities of the two kinds of optimization schemes proposed by the present invention will be compared. The method of computing a complexity of subchannel allocation when the Vogel's method is used has been already described.

According to the computing method, the RA-based sub-optimization scheme requires operation with a quantity of $KN+N(K-1)^2+N(N-1)/2$. Equation (16) shows a sub-optimization scheme through the consecutive subchannel allocation.

$$K_1 N + N(K_1 - 1)^2 + N(N-1)/2 + \quad (16)$$
$$\{K_2 N_{MA} + N_{MA}(K_2-1)^2 + N_{MA}(N_{MA}-1)/2\} \cdot N_{Ite}$$

When $K_1=K_2=4$, $R_M=2$, $P_T=30$ dB, and γ=0 dB, the entire quantities of operation for the subchannel allocations according to the two kinds of schemes proposed by the present invention were 5664 and 3017, respectively. Therefore, the second sub-optimization scheme can find the solution by one-half of operation as compared with the operation by first sub-optimization scheme.

Further, as the number of users increases, the number of operations can be further reduced. The values $N_{MA}$ and $N_{Ite}$ were obtained through actual experiments.

In summary, the present invention has the following effects.

First, the present invention can simplify the method of determining an optimal solution using the existing IP by separating the subchannel allocation and the bit allocation.

Second, the present invention provides an RA-based sub-optimization scheme capable of solving the RA problem in an OFDMA system using an RA-based adaptive modulation scheme, which includes some users using services of fixed transmission rates, thereby improving system performance in performing adaptive modulation.

Third, the present invention proposes another scheme of sequentially allocating subchannels to users when the fixed transmission rate has a sufficiently small value, thereby reducing the complexity of the RA-based sub-optimization scheme.

While the present invention has been shown and described with reference to certain preferred embodiments thereof, it will be understood by those skilled in the art that various changes in form and details may be made therein without departing from the spirit and scope of the invention as defined by the appended claims.

The invention claimed is:

1. A method for allocating subchannels and bits to users in a mobile communication system including users requiring services of fixed transmission rates and users requiring services of variable transmission rates, for adaptive modulation, the method comprising the steps of:

determining a real number $\{z, c_k\}$ using a Lagrange Multiplier Method, the real number $\{z, c_k\}$ maximizing an objective equation in order to reconstruct a variable rate adaptive problem into a delivery problem;

solving the delivery problem through linear programming and allocating subchannels to the users; and allocating bits to the subchannels allocated to the users using a Greedy Algorithm, wherein the Lagrange Multiplier Method is based on $$\max_{z, c_k}(z, c_k, \lambda, \mu) =$$
$$z - \lambda \left( \sum_{k \in U_{Fixed}} f_k(c_k) \cdot R_M / \alpha_k^2 c_k + \sum_{k \in U_{RA}} f_k(c_k) \cdot z / \alpha_k^2 c_k - P_T \right) -$$
$$\mu \left( \sum_{k \in U_{Fixed}} R_M / c_k + \sum_{k \in U_{RA}} z / c_k - N \right)$$

wherein $c_k$ denotes a number of bits to be allocated to a k-th user, $R_k$ denotes a k-th user's data rate, $P_T$ denotes total allocated power, $U_{Fixed}$ denotes a number of users requiring services of fixed transmission rates, $U_{RA}$ denotes a number of users requiring services of variable transmission rates, $f_k(c_k)$ denotes the K-th user's transmission power required for transmission satisfying a desired BER at a reception-side when a channel gain is 1, N denotes a number of the total subchannels, $\alpha_k$ denotes a k-th user's channel gain, and λ and μ are parameters.

2. The method as claimed in claim 1, wherein same bits are allocated to the subchannels allocated to the users.

3. The method as claimed in claim 1, wherein the bits are first allocated to the users requiring the services of the fixed transmission rates and next to the users requiring the services of the variable transmission rates.

4. A method for allocating subchannels and bits in a mobile communication system including users that are using two different kinds of services for adaptive modulation, first users requiring services of fixed transmission rates and second users requiring services of variable transmission rates, the method comprising the steps of:

(1) allocating subchannels and bits to the second users;

(2) determining an initial number $N_{MA}$ of subchannels to be allocated to the first users;

(3) consequently releasing the determined initial number $N_{MA}$ of subchannels from among the subchannels previously allocated to the second users;

(4) reallocating the released subchannels to the first users;

(5) allocating bits for the first users to reallocated subchannels; and (6) repeating steps 3 through 5 a predetermined number of times for generating a number of non-initial released subchannels.

5. The method as claimed in claim 4, wherein, in step 3, the initial number of subchannels are released according to a sequence in which a subchannel having a lowest channel quality precedes other channels.

6. The method as claimed in claim 4, wherein, in step 2, the initial number $N_{MA}$ is determined by $$N_{MA} = \sum_{k \in U_{Fixed}} n_k = \sum_{k \in U_{Fixed}} R_M / c_k^*$$

wherein $c_k$ denotes a number of bits to be allocated to a k-th user, $R_k$ denotes a k-th user's data rate, and $U_{Fixed}$ denotes a number of the first users requiring services of fixed transmission rates.

7. The method as claimed in claim 4, wherein $c_k$ is obtained by applying parameters $(\lambda, \mu)$ to $$\max_{c_k, z}(z, c_k, \lambda, \mu) = z - \lambda \left( \sum_{k=1}^{K_1} f_k(c_k) \cdot R_M / \alpha_k^2 c_k + \sum_{k=1}^{K_2} f_k(c_k) \cdot z / \alpha_k^2 c_k - P_T \right) -$$

$$\mu \left( \sum_{k=1}^{K_1} R_M / c_k + \sum_{k=1}^{K_2} z / c_k - N \right)$$

$$\approx z_1 - \lambda_1 \left( \sum_{k=1}^{K_2} f_k(c_k) \cdot z_1 / \alpha_k^2 c_k - P_T \right) - \mu_1 \left( \sum_{k=1}^{K_2} z_1 / c_k - N \right),$$

wherein $P_T$ denotes a total allocated power, $K_1$ denotes a number of the first users requiring services of fixed transmission rates, $K_2$ denotes a number of the second users requiring services of variable transmission rates, $f_k(c_k)$ denotes the K-th user's transmission power required for transmission satisfying a desired BER at a reception-side when a channel gain is 1, N denotes a number of the total subchannels, and $\alpha_k$ denotes a k-th user's channel gain.

8. An apparatus for transmitting data to users through adaptive modulation in a mobile communication system including users requiring services of fixed transmission rates and users requiring services of variable transmission rates, the apparatus comprising:

a subchannel allocation and bit loading algorithm unit for determining a real number $\{z, c_k\}$ that maximizes an objective equation using a Lagrange Multiplier Method in order to reconstruct a variable rate adaptive problem into a delivery problem, solving the delivery problem through linear programming and allocating subchannels to each of the users, and allocating bits to the subchannels allocated to the users by using a Greedy Algorithm;

an adaptive modulator for adaptively modulating user data by means of the subchannels and bits allocated to the users and separately outputting the data for the allocated subchannels; and an Inverse Fast Fourier Transform (IFFT) unit for converting the separated user data into a time domain signal and outputting the time domain signal as a signal sequence, wherein the Lagrange Multiplier Method is based on $$\max_{z, c_k}(z, c_k, \lambda, \mu) =$$

$$z - \lambda \left( \sum_{k \in U_{Fixed}} f_k(c_k) \cdot R_M / \alpha_k^2 c_k + \sum_{k \in U_{RA}} f_k(c_k) \cdot z / \alpha_k^2 c_k - P_T \right) -$$

$$\mu \left( \sum_{k \in U_{Fixed}} R_M / c_k + \sum_{k \in U_{RA}} z / c_k - N \right)$$

wherein $c_k$ denotes a number of bits to be allocated to a k-th user, $R_k$ denotes a k-th user's data rate, $P_T$ denotes a total allocated power, $U_{Fixed}$ denotes a number of users requiring services of fixed transmission rates, $U_{RA}$ denotes a number of users requiring services of variable transmission rates, $f_k(c_k)$ denotes the K-th user's transmission power required for transmission satisfying a desired BER at a reception-side when a channel gain is 1, N denotes a number of the total subchannels, $\alpha_k$ denotes a k-th user's channel gain, and $\lambda$ and $\mu$ are parameters.

9. The apparatus as claimed in claim 8, wherein the subchannel allocation and bit loading algorithm unit allocates same bits to the subchannels allocated to the users.

10. The apparatus as claimed in claim 8, wherein the subchannel allocation and bit loading algorithm unit first allocates the bits to the users requiring the services of the fixed transmission rates and next to the users requiring the services of the variable transmission rates.

11. An apparatus for transmitting data to users through adaptive modulation in a mobile communication system including first users requiring services of fixed transmission rates and second users requiring services of variable transmission rates, the apparatus comprising:

a subchannel allocation and bit loading algorithm unit for allocating subchannels and bits to the second users, determining an initial number of subchannels to be allocated to the first users, releasing the initial number of subchannels from among the subchannels allocated to the second users, reallocating the released subchannels to the first users, and allocating bits for the first users to reallocated subchannels;

an adaptive modulator for adaptively modulating user data by means of the subchannels and bits allocated to the users and separately outputting the data for each of the allocated subchannels; and an Inverse Fast Fourier Transform (IFFT) unit for converting the separated user data into a time domain signal and outputting the time domain signal as a signal sequence, wherein the subchannel allocation and bit loading algorithm unit repeats the process from the releasing of the initial number of subchannels to the allocation of the bits a predetermined number of times.

12. The apparatus as claimed in claim 11, wherein the subchannel allocation and bit loading algorithm unit releases the initial number of subchannels according to a sequence in which a subchannel having a lowest channel quality precedes other channels.

13. The apparatus as claimed in claim 11, wherein the subchannel allocation and bit loading algorithm unit determines the initial number $N_{MA}$ by $$N_{MA} = \sum_{k \in U_{Fixed}} n_k = \sum_{k \in U_{Fixed}} R_M / c_k^*,$$

wherein $c_k$ denotes a number of bits to be allocated to a k-th user, $R_k$ denotes a k-th user's data rate, and $U_{Fixed}$ denotes a number of the first users requiring services of fixed transmission rates.

14. The apparatus as claimed in claim 13, wherein $c_k$ is obtained by applying parameters $(\lambda, \mu)$ to $$\max_{c_k, z}(z, c_k, \lambda, \mu) = z - \lambda \left( \sum_{k=1}^{K_1} f_k(c_k) \cdot R_M / \alpha_k^2 c_k + \sum_{k=1}^{K_2} f_k(c_k) \cdot z / \alpha_k^2 c_k - P_T \right) -$$

$$\mu \left( \sum_{k=1}^{K_1} R_M / c_k + \sum_{k=1}^{K_2} z / c_k - N \right)$$

$$\approx z_1 - \lambda_1 \left( \sum_{k=1}^{K_2} f_k(c_k) \cdot z_1 / \alpha_k^2 c_k - P_T \right) - \mu_1 \left( \sum_{k=1}^{K_2} z_1 / c_k - N \right),$$

wherein $P_T$ denotes a total allocated power, $K_1$ denotes a number of the first users requiring services of fixed transmission rates, $K_2$ denotes a number of the second users requiring services of variable transmission rates, $f_k(c_k)$ denotes the K-th user's transmission power required for transmission satisfying a desired BER at a reception-side when a channel gain is 1, N denotes a number of the total subchannels, and $\alpha_k$ denotes a k-th user's channel gain.

15. An apparatus for receiving user data transmitted through adaptive modulation in a mobile communication system including users requiring services of fixed transmission rates and users requiring services of variable transmission rates, the apparatus comprising:

a Fast Fourier Transform (FFT) unit for dividing the user data for each subchannel and converting divided user data streams into frequency domain signals;

a subchannel allocation and bit loading algorithm unit for determining a real number $\{z, c_k\}$ using a Lagrange Multiplier Method, which maximizes an objective equation in order to reconstruct a variable rate adaptive problem into a delivery problem, solving the delivery problem through linear programming and allocating subchannels to each of the users, and allocating bits to the subchannels allocated to the users using a Greedy Algorithm; and an adaptive demodulator for adaptively demodulating the user data streams of the frequency domain by using the allocated subchannels and bits, wherein the Lagrange Multiplier Method is based on $$\max_{z, c_k}(z, c_k, \lambda, \mu) =$$

$$z - \lambda \left( \sum_{k \in U_{Fixed}} f_k(c_k) \cdot R_M / \alpha_k^2 c_k + \sum_{k \in U_{RA}} f_k(c_k) \cdot z / \alpha_k^2 c_k - P_T \right) -$$

$$\mu \left( \sum_{k \in U_{Fixed}} R_M / c_k + \sum_{k \in U_{RA}} z / c_k - N \right)$$

wherein $c_k$ denotes a number of bits to be allocated to a k-th user, $R_k$ denotes a k-th user's data rate, $P_T$ denotes a total allocated power, $U_{Fixed}$ denotes a number of users requiring services of fixed transmission rates, $U_{RA}$ denotes a number of users requiring services of variable transmission rates, $f_k(c_k)$ denotes the K-th user's transmission power required for transmission satisfying a desired BER at a reception-side when a channel gain is 1, N denotes a number of the total subchannels, $\alpha_k$ denotes a k-th user's channel gain, and $\lambda$ and $\mu$ are parameters.

* * * * *